United States Patent [19]

Elfick et al.

[11] 4,317,286
[45] Mar. 2, 1982

[54] PHOTOGRAMMETRIC APPARATUS

[75] Inventors: Michael H. Elfick, Cary Bay; Michael J. Fletcher, Killara, both of Australia

[73] Assignee: The University of Newcastle Research Associates Ltd., Australia

[21] Appl. No.: 100,425

[22] Filed: Dec. 5, 1979

[30] Foreign Application Priority Data

Dec. 14, 1978 [AU] Australia .............................. PD7118
Mar. 13, 1979 [AU] Australia .............................. PD7993

[51] Int. Cl.³ .............................................. B43L 13/16
[52] U.S. Cl. .................................. 33/1 A; 33/20 D; 350/136; 353/6; 356/2
[58] Field of Search ................. 353/6; 33/1 A, 20 D, 33/20 R; 350/136; 356/2

[56] References Cited

U.S. PATENT DOCUMENTS

| | | |
|---|---|---|
| 2,377,509 | 6/1945 | Miller . |
| 2,560,658 | 7/1971 | Pareto ................................. 33/20 R |
| 2,964,642 | 12/1960 | Hobrough . |
| 2,964,643 | 12/1960 | Hobrough . |
| 2,964,644 | 12/1960 | Hobrough . |
| 3,116,555 | 1/1964 | Helava . |
| 3,655,911 | 4/1972 | Johnston . |
| 3,678,582 | 7/1972 | Helava et al. |
| 3,750,293 | 8/1973 | Forrest . |
| 3,765,094 | 10/1973 | Yzerman . |
| 3,901,595 | 8/1975 | Helava et al. |
| 3,989,933 | 11/1976 | Inghilleri . |
| 4,057,336 | 11/1977 | Malinge . |
| 4,081,690 | 3/1978 | Grubner et al. |

FOREIGN PATENT DOCUMENTS

| | | |
|---|---|---|
| 1928753 | 12/1972 | Fed. Rep. of Germany . |
| 2415432 | 10/1974 | Fed. Rep. of Germany . |
| 2443791 | 5/1975 | Fed. Rep. of Germany . |
| 2425986 | 12/1975 | Fed. Rep. of Germany . |
| 260878 | 8/1949 | Switzerland ........................ 33/1 A |
| 876740 | 9/1961 | United Kingdom . |
| 987854 | 3/1965 | United Kingdom . |

OTHER PUBLICATIONS

K. Schwedessky, "A New Precision-Stereo Comparator" vol. 3 (1960), pp. 124-134, Bildmessing and Luflbebnesu.
Carl Dress, Sales Brochure "ISK 2 Precision Stereo Comparator, Recording Unit Ecomat 21".

Primary Examiner—William D. Martin, Jr.
Attorney, Agent, or Firm—Ostrolenk, Faber, Gerb & Soffen

[57] ABSTRACT

An apparatus for use in photogrammetry is disclosed having two spaced-apart parallel scanning zones to which the photographs of a stereoscopic pair of photographs are mounted.

A carriage mounted optical scanning system is provided for scanning the two scanning zones and for projecting images of the respective zones to a binocular viewing system, and a secondary optical system is provided, preferably on the carriage, for superimposing reference marks on the projected images.

The scanning system is arranged in such a manner that simultaneous scanning of the two scanning zones can be effected in a first direction parallel to the scanning zones, and independent scanning of the two scanning zones can be effected in a second direction which is parallel to the scanning zones and orthogonal to the first direction. Also, the apparatus is adapted to permit relative scanning of the two scanning zones in the first direction or for optically moving the reference marks relative to one another in the first direction.

12 Claims, 11 Drawing Figures

PHOTOGRAMMETRIC APPARATUS

FIELD OF THE INVENTION

This invention relates to a photogrammetric apparatus for use in determining three-dimensional terrain measurements from a stereoscopic image which is derived from viewing a stereo-pair of aerial photographs.

BACKGROUND OF THE INVENTION

Photogrammetry is the science of determining dimensions of objects revealed by photographic images. Relative dimensions of the objects are derived from the photographs and are scaled, usually as a photogrammetric machine function, with reference to actual measurements which are obtained, separately from the photographs, of one or more points in the field of the photographs. The science has developed since the 1920's and, since about 1940, particular emphasis has been placed on the production of high quality topographical maps using stereoscopic aerial photography.

Apparatus which currently is being employed for photogrammetric measurement may be regarded as falling in one of two general groups.

The first group includes Mechanical Analogue Machines which are operated by setting a stereo-pair of photographs in their correct relative orientation and by arranging a viewing system such that mechanical "observing rays" are coupled to a drawing mechanism.

The second group includes so-called Analytical Machines which measure the co-ordinates of selected corresponding points on each photograph of a stereo-pair and compute from the derived observations the true position of each point. These machines may be categorized as falling within one of two sub-groups, consisting of Simple Systems and Precision Analytical Machines. In the Simple Systems an operator manually positions a reference mark on a selected point on each photograph of a stereo-pair, obtains a read-out of ordinates with respect to the photo-centre and computes from this data the actual geographic location of a point. The Precision Analytical Machines are highly complex machines which incorporate built-in computers and elaborate servomechanisms for the purpose of providing an opto-electrical function which is analogous to the Mechanical Analogue Machines.

Of the abovementioned known types of apparatus, the Mechanical Analogue Machines are expensive, are difficult to set-up (the positioning of the photographs is generally effected by an iterative process that takes from one to six hours per model), and require a highly trained operator. Moreover, with the Mechanical Analogue Machines, the focal point is fixed mechanically in the plotter and the machines can only be used with photographs which have been obtained from compatible cameras. Additionally, corrections for problems such as lens distortion in the camera have to be made by use of elaborately constructed optical or mechanical correcting devices. The known Analytical Machines avoid most of these problems, but the simple types are slow to use and relatively inaccurate and the Precision Machines are very expensive.

The abovementioned types of apparatus are suitable for use by mapping organisations that can justify heavy capital expenditure and specialized staff employment. However, there are situations, such as in the mining or forestry industries or in military survey applications, which require relatively inexpensive photogrammetry machines which can be set up quickly and simply by an operator with limited photogrammetric training.

OBJECTS OF THE INVENTION

The present invention seeks to provide an apparatus which has an operational flexibility that approaches that of the more expensive types of known Analytical Machines but which possesses an accuracy and cost structure commensurate with the cheaper Mechanical Analogue Machines.

Furthermore, the apparatus of the present invention has been developed for use by persons who do not have extensive training in photogrammetry.

SUMMARY OF THE INVENTION

The present invention provides an apparatus for use in photogrammetry and which comprises two scanning zones which are located in spaced-apart substantially parallel relationship. Means are provided for mounting each photograph of a stereoscopic pair of photographs to a respective one of the scanning zones. An optical scanning system is arranged to scan the two scanning zones and to project images of the respective zones, and means are provided for optically superimposing reference marks on the projected images. The optical scanning system comprises means permitting simultaneous scanning of the two scanning zones in a first direction parallel to the scanning zones, means permitting relative scanning of the two scanning zones in the first direction or for optically moving the reference marks relative to one another in the first direction, and means permitting independent scanning of the two scanning zones in a second direction which is parallel to the scanning zones and orthogonal to the first direction.

PREFERRED FEATURES OF THE INVENTION

The optical scanning system preferably comprises a carriage which is movable relative to the scanning zones in the first direction, and two optical heads are preferably mounted to the carriage for movement independently of one another in the second direction.

Thus, in a preferred form of the invention the optical scanning system may be defined as comprising: a carriage which is movable relative to the scanning zones in the first direction, two optical heads mounted to the carriage for movement independently of one another in the second direction, and means located in at least one of the image projection paths which permit relative scanning of the two scanning zones in the first direction.

The means which permit relative scanning of the two scanning zones in the first direction most preferably comprise two parallel plate micrometers, each being located in a respective image projection path.

In photogrammetric terms, the apparatus as above defined provides for a common y-motion of the carriage, a δy-motion or δy-motions, and separate x-motions for the two optical heads. Such system provides for an apparatus which is fundamentally different from known prior art apparatus, in which separate y-motions and separate x-motions are employed in the scanning system.

In accordance with a preferred feature of the present invention, the two scanning zones are located in spaced-apart parallel planes and the carriage is driven to move back and forth between and parallel to the two scanning zones. This permits the construction of a relatively compact apparatus.

Also in accordance with a preferred feature of the invention, a first stepping motor is provided for driving the carriage and two further stepping motors are provided for driving the optical heads, one such further motor being arranged to drive each of the heads. Drive for the parallel plate micrometer or micrometers (i.e. for effecting the δy-motion or motions) is preferably obtained from a fourth stepping motor.

Drive control for the four stepping motors is preferably obtained from processors which sample an operator's instruction as to where the reference marks (seen as a single mark) are to be moved in a perceived three-dimensional image of the scanned photographs and which provide drive signals for the stepping motors.

The invention will be more fully understood from the following description of exemplary embodiments of a photogrammetric apparatus. The description is given with reference to the accompanying drawings.

DETAILED DESCRIPTION OF THE INVENTION

Figure 1:
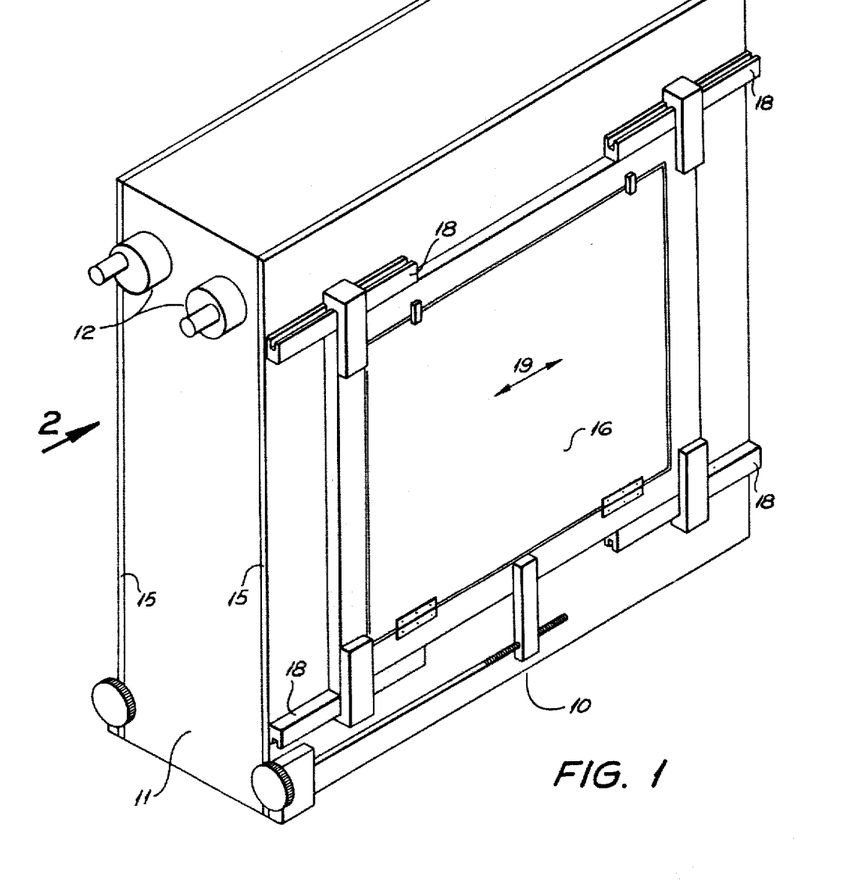
FIG. 1 shows a perspective view of the apparatus.
Figure 2:
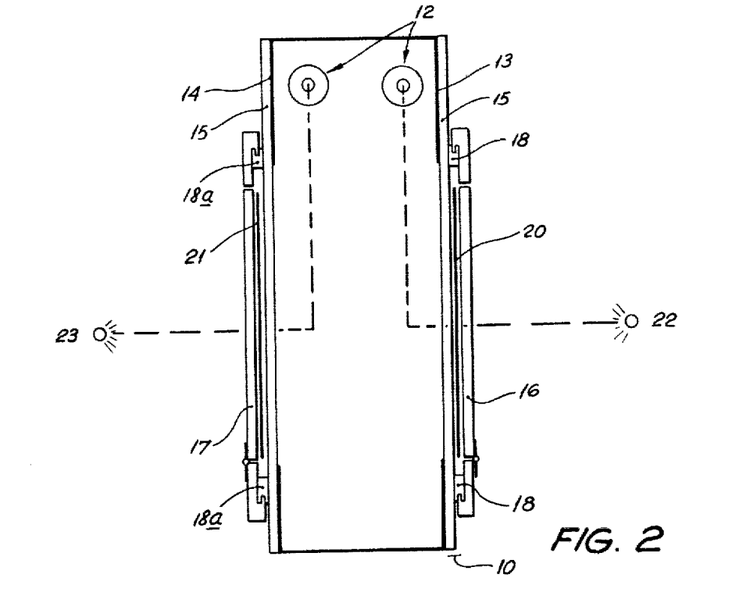
FIG. 2 shows an end elevation view of the apparatus as seen from the direction of arrow 2 in FIG. 1.

As shown in FIGS. 1 and 2, the apparatus comprises an oblong metal casing 10 which houses an optical scanning system (see FIG. 4) and which has an end wall 11 to which a binocular viewing system 12 is mounted. The casing 10 has the dimensions: 460 mm long × 460 mm high × 150 mm wide, and any binocular viewing system that can focus on infinity may be mounted to the casing.

Figure 1A:
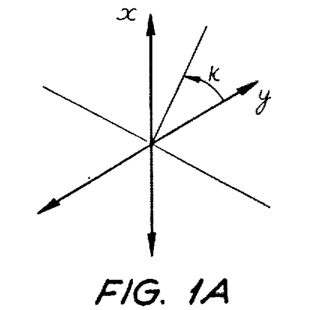
FIG. 1A shows a co-ordinate system which is employed as a reference for directions referred to in the following description.

Right and left-hand vertical side walls 13 and 14 of the casing (FIG. 2) are fitted with transparent glass or plastics material windows 15 (previously referred to as scanning zones), and transparent material photograph carriers 16 and 17 are mounted to the windows in face-to-face sliding relationship. The right-hand carrier 16 is mounted to the casing by way of slides 18, which permit coarse adjustment of the position of the carrier 16 in the directions indicated by arrow 19 (FIG. 1), and the left-hand carrier 17 is mounted to the opposite side 14 of the casing by way of a slide arrangement 18a which permits rotation of the carrier. Thus, with reference to the co-ordinate system shown in FIG. 1A, the right-hand carrier 16 is mounted for linear adjustment in the direction of the y-axis and the left-hand carrier 17 is mounted for angular (κ) adjustment in the x,y plane, about an axis normal to the x,y plane.

In operation of the apparatus and as shown in FIG. 2, a stereo-pair of photographs is mounted to the casing 10, one photograph 20 of the pair being mounted by the right-hand carrier 16 and the other photograph 21 being mounted by the left-hand carrier 17. The photographs would normally be diapositive prints and they are mounted to the opposite sides of the casing 10 so that they are disposed in parallel, approximately confronting, relationship. Light from external sources 22 and 23 illuminate the surface area of the respective photographs 20 and 21, and passes into the casing to be reflected into the respective lenses of the binocular viewing system 12.

It will be understood that, when the photographs 20 and 21 of the stereo-pair are correctly positioned relative to one another, a three-dimensional image will be seen to exist by a person who views through the binocular viewing system 12. Thus, the system provided by the apparatus of FIGS. 1 and 2 may be regarded as optically equivalent to the system that is shown for illustrative purposes only in FIG. 3 and in which the photographs are shown translated through 90° to lie in a common horizontal plane.

Figure 4:
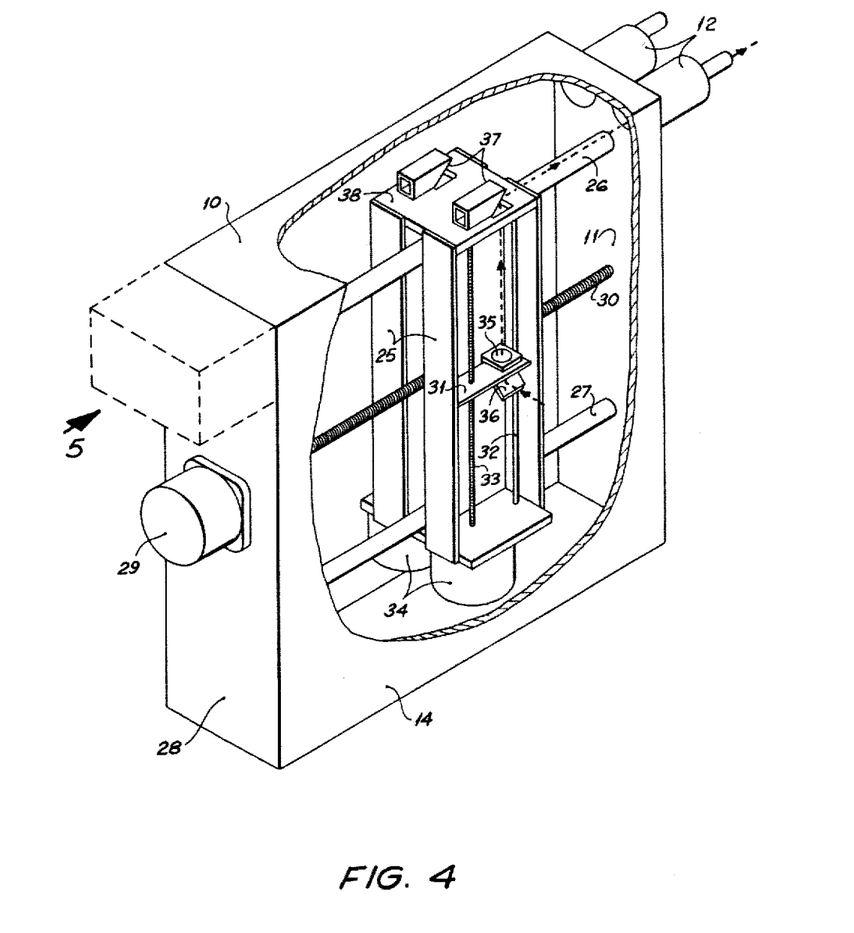
FIG. 4 shows a perspective view of the apparatus as seen from the direction of arrow 4 as shown in FIG. 1, with a portion of one side wall of the casing of the apparatus being broken-away to reveal the interior of the casing.

Reference is now made to FIG. 4 of the drawings, which shows the optical scanning system within the casing 10.

The scanning system comprises a carriage 25 which is mounted by linear bearings (not shown) to a pair of horizontally extending vertically spaced guide rails 26 and 27. The guide rails are secured to end walls 11 and 28 of the casing and they permit movement of the carriage 25 in the y-direction only. A lead screw 30 which is driven by a stepping motor 29 connects with the carriage by way of a recirculating ball coupling arrangement, so that rotation of the screw 30 causes linear movement to be imparted to the carriage in the y-direction.

The carriage 25 mounts two separate optical systems, one of which is associated with the right-hand photograph 20 and the other of which is associated with the left-hand photograph 21. FIG. 4 shows the optical system which is associated with the left-hand photograph, the system which is associated with the right-hand photograph and which is located on the hidden side of the carriage 25 comprising a similar arrangement of parts.

As shown, the optical system which is associated with the left-hand photograph comprises an optical head 31 which is movable up and down the carriage 25 in the direction of the x-axis. The head 31 is coupled to a vertically extending guide rail 32 by way of a linear bearing (not shown) and it is driven for movement, upwardly and downwardly, by a lead screw 33. The lead screw 33 is driven by a stepping motor 34 and a connection is established between the lead screw and the head 31 by a recirculating ball coupling.

A lens 35 is mounted to the top side of the optical head 31 and a front surface mirror 36 is mounted to the underside of the head. The mirror is disposed to reflect through the lens light which illuminates the relevant area of the photograph 21, and the lens 35 is constructed to locate the viewed photograph image optically at infinity.

A half silvered mirror 37 is mounted to an apertured platform 38 adjacent the top of the carriage 25, and the mirror 37 is orientated to reflect incident light from the lens 35 into one of the objective lenses of the binocular viewing system 12. The passage of a light beam from a viewed area of the left-hand photograph to the left-hand objective lens of the binocular viewing system is indicated by the broken in FIG. 4, and a similar optical arrangement applies in respect of a light beam entering the opposite side of the casing by way of the right-hand photograph. Thus, at each side of the carriage 25 light passes horizontally through the area being observed on the respective photographs of the stereo-pair and falls incident on the respective front surface mirrors 36. The mirrors then reflect the light beam vertically through the respective lenses 35 to the aligned half silvered mirrors 37, at which the light beams are reflected horizontally into the respective objective lenses of the binocular viewing system 12.

An important feature of the apparatus which has been described thus far is that a single stepping motor 29 is employed to drive the carriage 25 (including the two, left-hand and right-hand, optical systems) in the y-direction, whereas two stepping motors 34 are employed for driving the optical heads 31 in the x-direction, one motor being coupled to the left-hand head and the other being coupled to the right-hand head. Thus, a common y-drive is applied to the optical scanning system, whereas separate $x_R$ and $x_L$ drives are applied to the system.

In use of the system, a reference mark is superimposed on the perceived three-dimensional image by way of an optical system, herein referred to as a secondary optical system, which is located at the end 28 of the casing 10. The secondary optical system is indicated by the broken outline in FIG. 4 and is detailed in FIG. 5 of the drawings.

Figure 5:
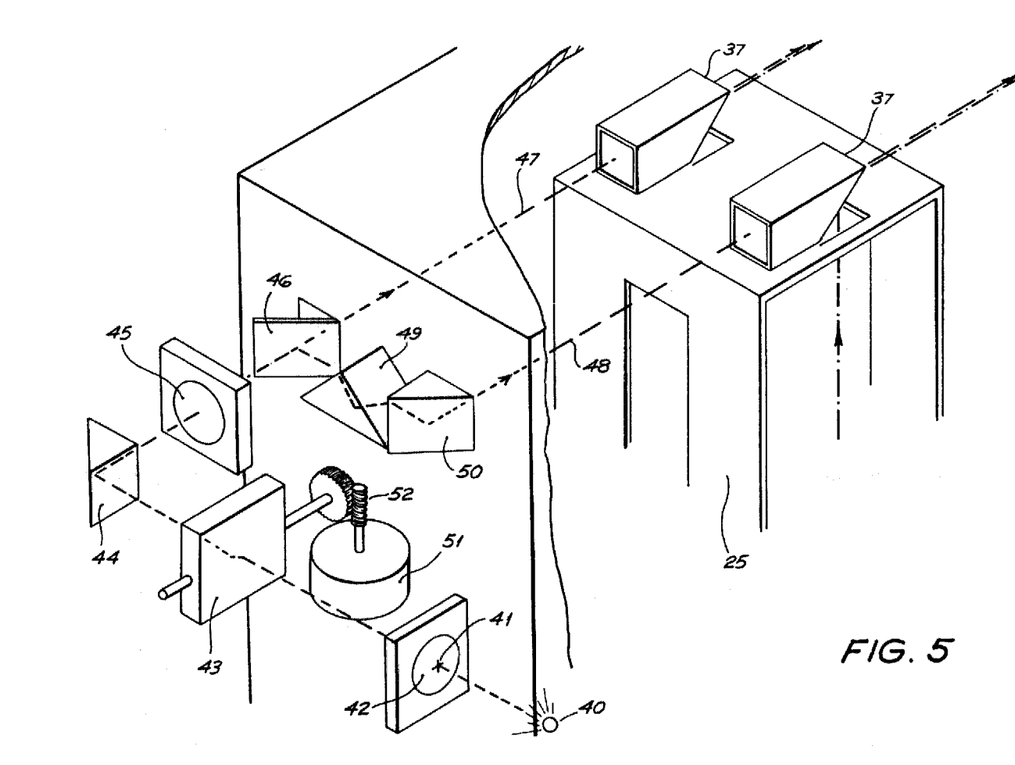
FIG. 5 shows, to an enlarged scale, a portion of the upper left-hand end of the apparatus shown in FIG. 4 and as viewed in the direction of arrow 5.

The secondary optical system comprises a light source 40, which illuminates a reference mark 41 on a glass plate 42, and a parallel plate micrometer 43. An image of the illuminated reference mark is transmitted through the parallel plate micrometer 43, through a prism 44, through a lens system 45 (which locates the reference mark optically at infinity) and to a half silvered mirror 46 which splits the reference image light beam into two paths. One path, indicated by numeral 47 is transmitted through one of the half silvered mirrors 37 on the carriage 25 and to the right-hand eye-piece of the binocular viewing system 12. The second path, indicated by reference numeral 48, is obtained as a reflection from the mirror 46 and passes via the other half silvered mirror 37 to the left-hand eye-piece of the binocular viewing system 12. The second path is transmitted through a prism 49, which functions to invert the movement of the image generated by rotation of the parallel plate micrometer, and is reflected by a prism 50.

Rotational motion for the parallel plate micrometer 43 is derived from a stepping motor 51 and is transmitted by way of a worm-pinion transmission system 52.

When the parallel plate micrometer 43 is turned, the image of the reference mark 41 which impinges on the prism 44 will be caused to move up or down the prism (depending upon the direction of turning of the parallel plate micrometer) and the same direction of movement will occur at the half silvered mirror 46. However, the prism 49 provides an inversion in respect of the direction of movement of the reference mark image that impinges on the prism 50, so that as the beam path 47 rises, the beam path 48 simultaneously lowers, and vice versa. Then, because the two half silvered mirrors 37 are oriented at an angle (e.g. 45°) to the beam paths 47 and 48, whilst the beams 47 and 48 move vertically in mutually opposite directions, they will appear to move forward and backward (in mutually opposite directions) on the image of the respective photographs. Thus, a shift is effectively provided in the common y-motion produced by the carriage motor 29.

Referring now to the operation of the four stepping motors. In photogrammetric terms, the carriage drive motor 29 provides a common y-motion, the parallel plate micrometer motor 51 provides a δy-motion and the two optical head drive motors provide separate $x_R$ and $x_L$ motions.

In use of the apparatus, the right and left-hand photographs of the stereo-pair are mounted to the casing by way of the respective photograph carriers, as above described, and the orientation of the photographs is adjusted. Orientation adjustment is effected by employing computer aided techniques that are the same as those employed in the context of prior art Analytical Photogrammetric Machines but which are described briefly as follows:

Firstly, interior orientation is effected by manually adjusting the relative position of the photographs, using the previously described linear and rotational slide adjustment for the right and left hand photo carriers respectively, until a clear three-dimensional image is seen by a viewer to appear at the photocentre of the two photographs.

Secondly, relative orientation is effected by moving the perceived reference mark (i.e. the right and left hand images of the reference mark) to at least five selected positions on the viewed image, and using the corresponding positions of the left and right hand optical heads and the parallel plate micrometer at all of the selected positions to compute transformation parameters for a first microprocessor (see FIG. 6) which provides positional information for all of the stepping motors.

Thirdly, absolute orientation is effected by computing, from previously derived true ground parameters and positional inputs from the stereoscopic image, scale and rotational transformations.

Figure 6:
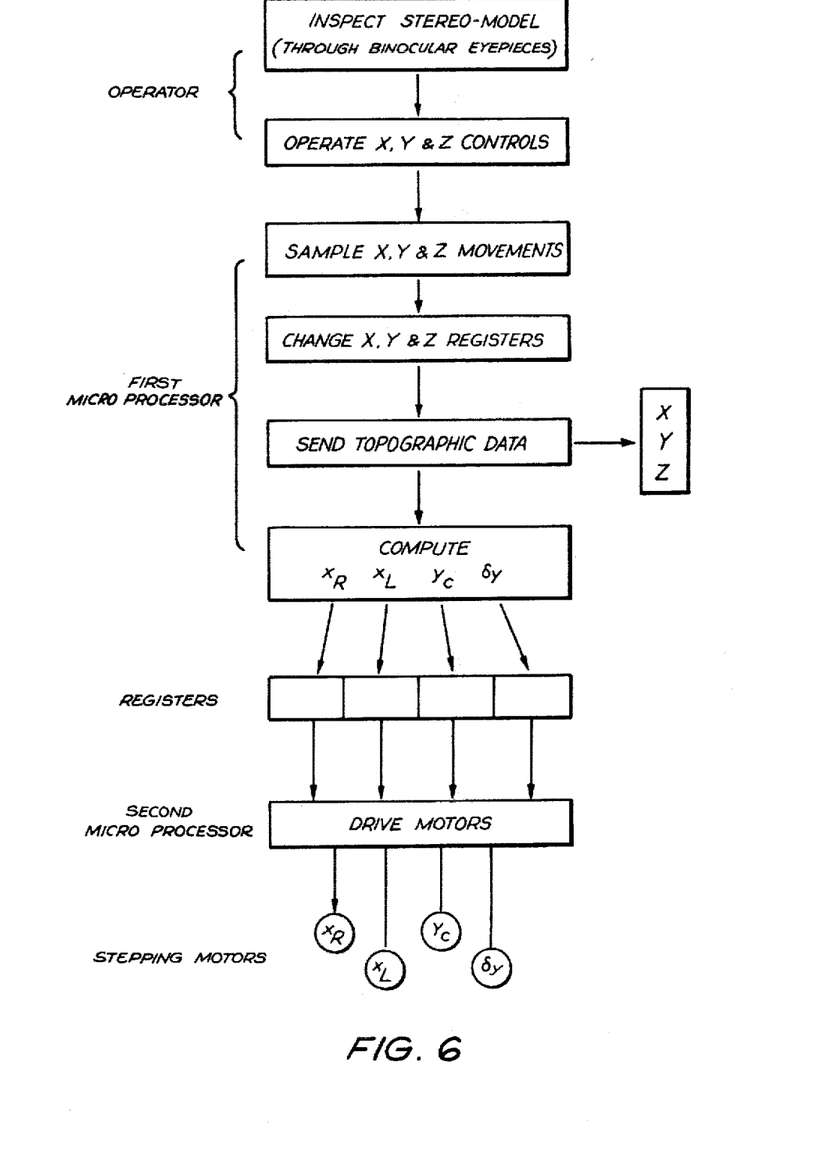
FIG. 6 shows by block diagram representation a control system for use in conjunction with the illustrated apparatus.

Having effected orientation of the stereoscopic pair of photographs and computation of transformations, as is indicated in FIG. 6 of the drawings a viewer/operator provides machine instructions as to a desired positioning of the reference mark in terms of an X, Y, Z location in the three-dimensional image. The positional instructions are sampled and corresponding values of $x_R$, $x_L$, $Y_C$ and δy are computed for locating the optical heads and observed position of the reference mark. Location is achieved by applying drives to the four motors via registers and a second microprocessor which is employed to control the respective motors.

The apparatus that has been described thus far with reference to FIGS. 1 to 5 is suitable for use in a system which utilises relatively low orders of magnification, but if higher orders of magnification (say, greater than ×8) are employed perception of a stereoscopic image may be lost if one image is raised relative to the other in a direction at right angles to the eye base. This problem is overcome if the position of the reference marks is fixed (so that a viewer's eyes remain stationary) and if a δy motion is achieved by locating a parallel plate micrometer in the path of the light beam that passes through one or both of the lenses 35.

Figure 7:
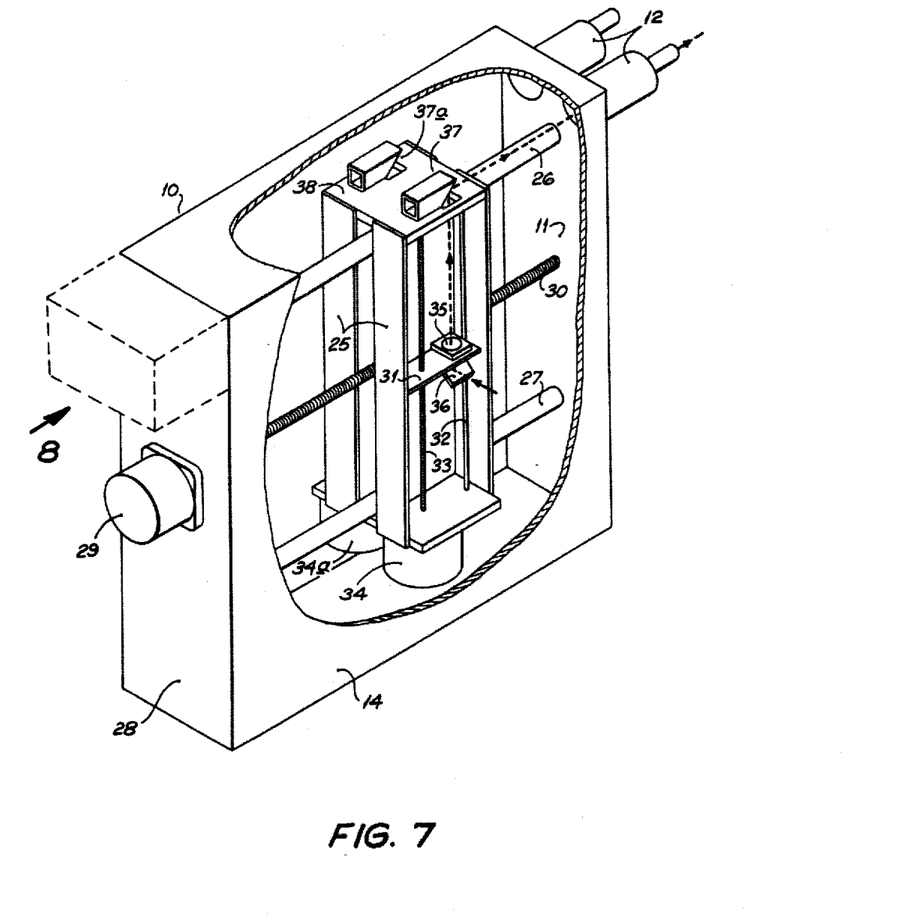
FIG. 7 illustrates a modified form of the apparatus and shows a perspective view of the apparatus as seen in the direction of arrow 7 of FIG. 1.
Figure 8:
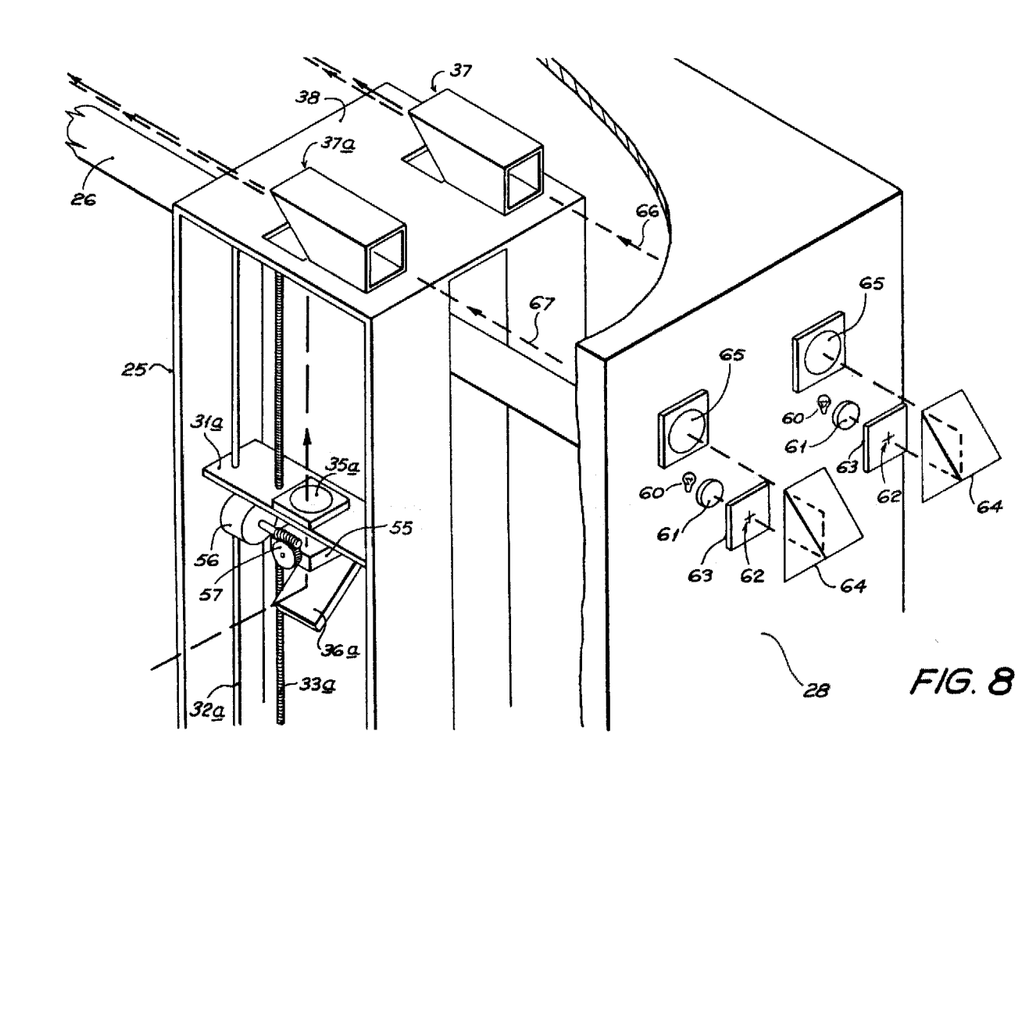
FIG. 8 shows a perspective view of a portion of the apparatus as illustrated in FIG. 7, the view being taken in the direction of arrow 8 as shown in FIG. 7.
Figure 9:
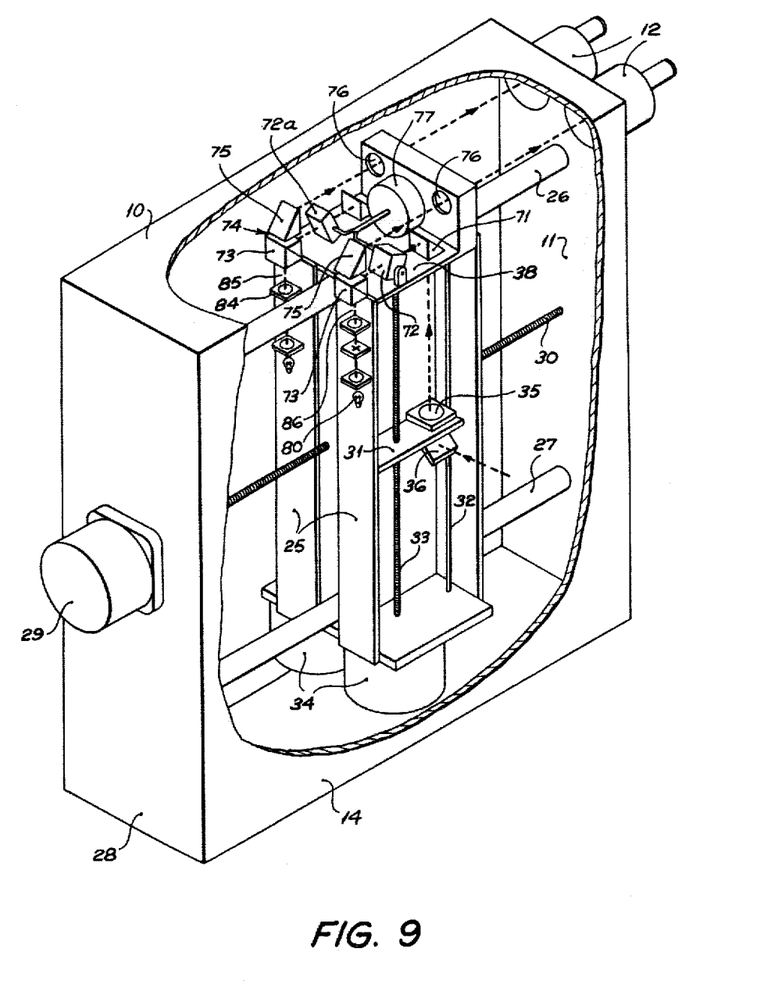
FIG. 9 illustrates a further modified form of the apparatus and shows a perspective view of the apparatus as seen in the direction of arrow 9 in FIG. 1.
Figure 10:
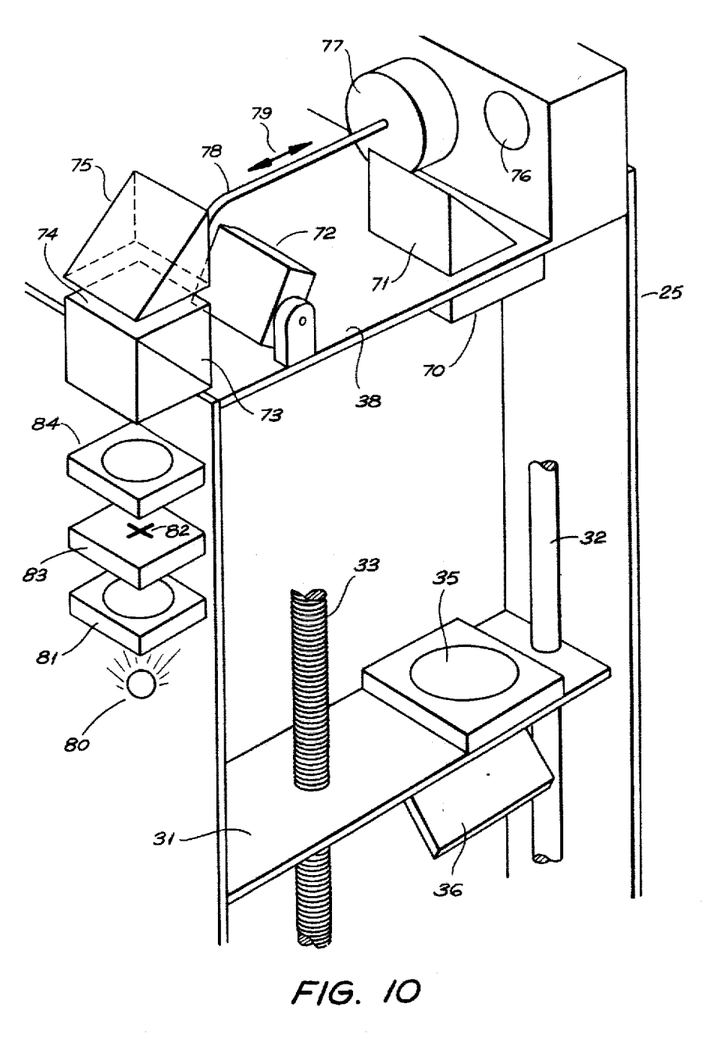
FIG. 10 shows a scrap view of a portion of one-half of the optical scanning system of the apparatus which is illustrated in FIG. 9.

Alternative systems for achieving this arrangement are shown in FIGS. 7, 8 and FIGS. 9, 10; the arrangement which is shown in FIGS. 9 and 10 being the most preferred because it makes less onerous the tolerences which need be imposed on mechanical construction of the apparatus.

Figure 3:
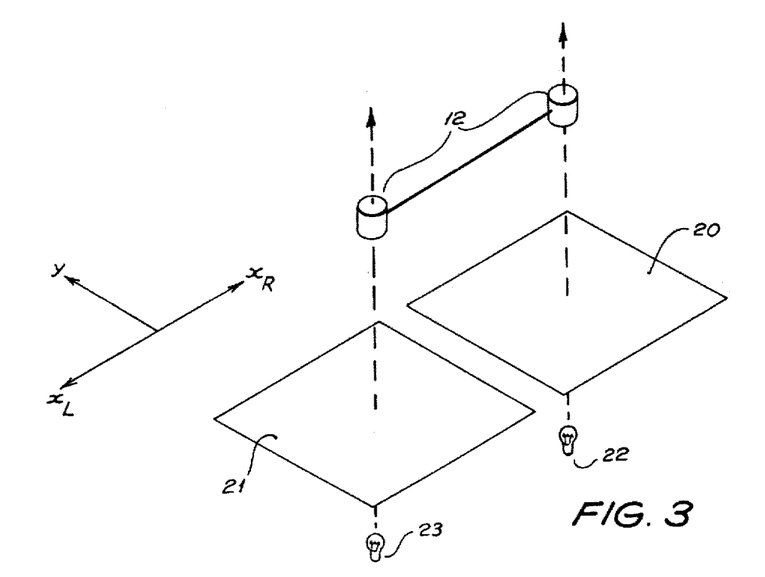
FIG. 3 shows an optical system that is equivalent to a system which is embodied in the apparatus illustrated by FIGS. 1 and 2.

Referring to the apparatus which is shown in FIGS. 7 and 8. This is superficially similar to that which is shown in FIGS. 1 to 3 and the description that has been given previously with reference to FIGS. 1 to 3 applies equally to the embodiment of the apparatus which is now to be described with reference to FIGS. 7 and 8. Like reference numerals are applied to like parts.

In the arrangement shown in FIGS. 7 and 8, the carriage 25 mounts two separate optical systems, one of which is associated with the right-hand photograph 20 and the other of which is associated with the left-hand photograph 21. FIG. 7 shows the optical system which is associated with the left-hand photograph, and FIG. 8 shows the optical system which is associated with the right hand photograph. The optical system as shown in FIG. 8 and associated with the right hand photograph is similar to that shown in FIG. 7, but it includes a parallel plate micrometer and drive therefor as hereinafter described.

As shown in FIG. 7 the optical system which is associated with the left-hand photograph comprises an optical head 31 which is movable up and down the carriage 25 in the direction of the x-axis. The head 31 is coupled to a vertically extending guide rail 32 by way of a linear bearing (not shown) and it is driven for movement, upwardly and downwardly, by a lead screw 33. The lead screw 33 is driven by a stepping motor 34 and a connection is established between the lead screw and the head 31 by a recirculating ball coupling.

A lens 35 is mounted to the top side of the optical head 31 and a front surface mirror 36 is mounted to the underside of the head. The mirror is disposed to reflect through the lens light which illuminates the relevant area of the photograph 21, and the lens 35 is constructed to locate the viewed photograph image optically at infinity.

A half silvered mirror 37 is mounted to an apertured platform 38 adjacent the top of the carriage 25, and the mirror 37 is orientated to reflect incident light from the lens 35 into one of the objective lenses of the binocular viewing system 12. The passage of a light beam from a viewed area of the left-hand photograph to the left-hand objective lens of the binocular viewing system is indicated by the broken line FIG. 7, and a similar optical arrangement applies in respect of a light beam entering the opposite side of the casing by way of the right-hand photograph.

Thus, referring to FIG. 8 of the drawings, the optical system associated with the right hand photograph includes an optical head 31a, a guide rail 32a, a leadscrew 33a, a stepping motor 34a, a lens 35a, a front surface mirror 36a and half-silvered mirror 37a, all of which correspond with the parts of the optical system associated with the left-hand photograph. However, the optical system as shown in FIG. 8 and which is associated with the right-hand photograph also includes a parallel plate micrometer 55. This is located in the image projection path and is interposed between the lens 35a and the mirror 36a. Rotational drive for the parallel plate micrometer 55 is provided by a stepping motor 56 and is transmitted by way of a worm-pinion transmission system 57. When the parallel plate micrometer 55 is turned (i.e. about the axis of the pinion 57), the scanned image of the right-hand photograph is shifted by a small amount in the y-direction. Hence, relative scanning of the left-hand and right-hand photographs is effected or, expressed another way, a δy shift is introduced.

At each side of the carriage 25 light passes horizontally through the area being observed on the respective photographs of the stereo-pair and falls incident on the respective front surface mirrors 36 and 36a. The mirrors then reflect the light beams vertically through the respective lenses 35 and 35a (at one side of the carriage by way of the parallel plate micrometer 55) to the aligned half silvered mirrors 37 and 37a, at which the light beams are reflected horizontally into the respective objective lenses of the binocular viewing system 12.

A reference mark is superimposed on the perceived three-dimensional image by way of an optical system, herein referred to as a secondary optical system, which is located at the end 28 of the casing 10. The secondary optical system is indicated by the broken outline in FIG. 7 and is detailed in FIG. 8 of the drawings. The secondary optical system comprises two light sources 60 and associated condensor lenses 61. The light sources illuminate respective reference marks 62 on glass plates 63. An image of each illuminated reference mark is transmitted through a prism 64, and through a lens system 65 which locates the reference mark optically at infinity. One reference image light beam path, indicated by numeral 66, is transmitted through the half silvered mirror 37 on the carriage 25 and to the left-hand eye-piece of the binocular viewing system 12. The second path, indicated by reference numeral 67, is transmitted through the other half silvered mirror 37a to the right-hand eye-piece of the binocular viewing system 12.

In photogrammetric terms, the carriage drive motor 29 provides a common y-motion, the parallel plate micrometer motor 56 provides a δy-motion and the two optical head drive motors 34 and 34a provide separate $x_R$ and $x_L$ motions.

Reference is now made to the embodiment of the invention which is illustrated in FIGS. 9 and 10 of the drawings. This too is superficially similar to that which is shown in FIGS. 1 to 3, and the description that has been given previously with reference to FIGS. 1 to 3 applies also to the embodiment of FIGS. 9 and 10, with like reference numerals being applied to like parts.

In the arrangement shown in FIGS. 9 and 10, the carriage 25 mounts two separate optical systems, one of which is associated with the right-hand photograph 20 and the other of which is associated with the left-hand photograph 21. FIG. 9 shows the optical system which is associated with the left-hand photograph and a part of the (almost identical) optical system which is associated with the right-hand photograph. FIG. 10 shows on an enlarged scale the optical system that is associated with the left-hand photograph.

The optical system which is associated with left and right-hand photographs respectively comprises an optical head 31 which is movable up and down the carriage 25 in the direction of the x-axis. The head 31 is coupled to a vertically extending guide rail 32 by way of a linear bearing (not shown) and it is driven for movement, upwardly and downwardly, by a lead screw 33. The lead screw 33 is driven by a stepping motor 34 and a connection is established between the lead screw and the head 31 by a recirculating ball coupling.

A lens 35 is mounted to the top side of the optical head 31 and a front surface mirror 36 is mounted to the underside of the head. The mirror 36 is disposed to reflect through the lens light which illuminates the relevant area of the photograph, and the lens 35 is constructed to locate the viewed photograph image optically at infinity.

A lens 70 (FIG. 10), a prism 71, a parallel plate micrometer 72 (or 72a) and a beam splitting cube 73 are mounted to the apertured platform 38 at the top of the carriage 25. The lens 70 focuses light from the lens 35, and the prism 71 reflects light from the lens 70 through the parallel plate micrometer 72 to the beam splitting cube 73. The beam splitting cube 73 reflects light from the lens 70 to the image plane 74.

A prism 75 is mounted above the image plane 74 and this acts to reflect light from the image plane through a lens 76. The lens 76 is constructed to locate the image from the image plane optically at infinity, and it is positioned to direct the image into a respective one of the objective lenses of the binocular viewing system 12.

The optical system that has been described thus far (with reference to FIGS. 9 and 10) is substantially the same for both the right and left-hand photographs. The only difference between the left and right-hand optics is the mounting and turning arrangement for the parallel plate micrometers 72 and 72a. Rotational drive for both of the parallel plate micrometers 72 and 72a is derived from a single stepping motor 77 which, when energised, causes rectilinear movement of its output shaft 78 in one or the other of the directions indicated by the arrow 79. Although the appropriate crank-linkage mechanisms are not shown in the drawing, movement of the shaft 78 causes counter-rotation of the two parallel plate micrometers 72 and 72a so that energisation of the motor 77 always causes the parallel plate micrometers to move in mutually opposite directions. This in turn results in the scanned image of each photograph being moved (in opposite senses) by a small amount in the y-direction. Hence, relative scanning of the left and right-hand photographs is effected in the y-direction or, expressed in another way, a δy shift is effected.

A reference mark is superimposed on the perceived three-dimensional image by way of a secondary optical system which is located at one end of the carriage 25.

The secondary optical system comprises two light sources 80 and associated condensor lenses 81. The light sources illuminate respective reference marks 82 on glass plates 83. An image of each illuminated reference mark is transmitted through a lens system 84 which locates the reference mark optically in the image plane 74. One reference image light beam path, indicated by numeral 85, is transmitted through one of the beam splitting cubes 73 on the carriage 25 and to the right-hand eye-piece of the binocular viewing system 12. The second path, indicated by reference numeral 86, is transmitted through the other beam splitting cube 73 to the left-hand eye-piece of the binocular viewing system 12.

The second and third embodiments of the apparatus, which have been described specifically with reference to FIGS. 8, 9 and FIGS. 9, 10 respectively are driven in the same manner as the first embodiment. Thus, the description which has been given hereinbefore with reference to FIG. 6 applies to all three embodiments of the invention.

What is claimed is:

1. An apparatus for use in photogrammetry and which comprises:
   means defining two scanning zones which are located in spaced-apart substantially parallel relationship;
   mounting means for mounting each photograph of a stereoscopic pair of photographs to a respective one of said means defining said two scanning zones in such a manner that each of the photographs is in a respective said scanning zone;
   an optical scanning system for scanning said two scanning zones and for projecting images of the respective photographs when mounted in said zones along image projection paths defined by said optical scanning system and associated with respective ones of said scanning zones; and
   means for optically superimposing reference marks on the projected images;
   said optical scanning system comprising:
   means for simultaneously scanning said two scanning zones in a first direction parallel to said scanning zones;
   means for scanning said scanning zones relative to each other in said first direction; and
   means for independently scanning said two scanning zones in a second direction which is parallel to said scanning zones but orthogonal to said first direction.

2. An apparatus for use in photogrammetry and which comprises:
   means defining two scanning zones which are located in spaced-apart substantially parallel relationship;
   mounting means for mounting each photograph of a stereoscopic pair of photographs to a respective one of said means defining said two scanning zones in such a manner that each of the photographs is in a respective said scanning zone;
   an optical scanning system for scanning said two scanning zones and for projecting images of the respective photographs when mounted in said zones along image projection paths defined by said optical scanning system and associated with respective ones of said scanning zones; and
   means for optically superimposing reference marks on the projected images;
   said optical scanning system comprising:
   means for simultaneously scanning said two scanning zones in a first direction parallel to said scanning zones;
   means for optically moving said reference marks relative to one another in said first direction; and
   means for independently scanning said two scanning zones in a second direction which is parallel to said scanning zones but orthogonal to said first direction.

3. An apparatus as claimed in claim 1, wherein said optical scanning system includes a carriage which is movable in said first direction relative to said scanning zones and two optical heads mounted to said carriage, one said optical head being located in each said image projection path; said optical heads being movable in said first direction with said carriage and constituting said means for simultaneously scanning said two scanning zones in said first direction, and said two optical heads being movable in said second direction independently of one another and constituting said means for independently scanning said two scanning zones in said second direction.

4. An apparatus as claimed in claim 3, wherein said means for scanning said scanning zones relative to each other in said first direction comprise a respective parallel plate micrometer disposed in each said image projection path.

5. An apparatus as claimed in claim 4, further comprising a stepping motor for applying drive to said optical means mounted on said carriage, said optical means being coupled to said stepping motor in such a manner as to be moved relative to said optical heads upon energization of said stepping motor.

6. An apparatus as claimed in claim 3 or claim 4, further comprising a first stepping motor for driving said carriage back and forth in said first direction and two further stepping motors for driving respective ones of said optical heads back and forth in said second direction.

7. An apparatus as claimed in claim 4, further comprising a stepping motor for applying drive to both of said parallel plate micrometers, said parallel plate micrometers being coupled to said stepping motor in such a manner as to be turned in counter rotating directions upon energization of said stepping motor.

8. An apparatus as claimed in claim 1 or claim 2, wherein said means for superimposing reference marks on the projected images comprises a secondary optical system, said secondary optical system comprising two reference mark carriers having respective reference marks thereon and respective optical projection systems for projecting images of respective said reference marks into respective said projection paths in such a manner as to superimpose each said reference mark onto a respective said projected image.

9. An apparatus as claimed in claim 8, wherein the elements of said secondary optical system are mounted to said carriage.

10. An apparatus as claimed in claim 1 or claim 2, further including a binocular viewing system for respectively receiving left-hand and right-hand image projections of the photographs mounted in the respective said scanning zones, and means disposed in said image projection paths for locating said projected images optically at infinity; and said means for optically superimposing reference marks on the projected images including means for projecting images of respective ones of said reference marks into said binocular viewing system for superimposing said respective reference marks onto said left-hand and right-hand image projections, respectively, and further including means for locating said reference marks optically at infinity.

11. An apparatus as claimed in claim 3, wherein said means for scanning said scanning zones relative to each other in said first direction comprise optical means movably mounted on said carriage and located in at least one said image projection path.

12. An apparatus as claimed in claim 3 or claim 4, wherein said two scanning zones are located in spaced-apart parallel planes and wherein said carriage is movable back and forth between and parallel to said scanning zones.

* * * * *